United States Patent [19]

Rich, III

[11] 4,209,491

[45] Jun. 24, 1980

[54] CONTROL AND MONITORING SYSTEM FOR OXYGEN GENERATING DEVICE

[75] Inventor: Edward L. Rich, III, Arnold, Md.

[73] Assignee: Midori Anzen Company, Ltd., Tokyo, Japan

[21] Appl. No.: 865,017

[22] Filed: Dec. 21, 1977

[51] Int. Cl.$^2$ .......................... B01J 7/00; A62B 7/08
[52] U.S. Cl. ........................ 422/110; 128/202.26; 340/584; 340/611; 422/105; 422/112; 422/113; 422/114; 422/117; 422/119; 422/120; 422/166
[58] Field of Search .................... 23/281; 137/12; 128/142 R, 191 R; 340/584, 611; 422/105, 110, 112, 113, 119, 120, 166, 114, 117

[56] References Cited

U.S. PATENT DOCUMENTS

| | | | |
|---|---|---|---|
| 3,092,104 | 6/1963 | Cassidy | 128/142 R |
| 3,957,044 | 5/1976 | Fletcher | 128/142.2 |
| 4,115,069 | 9/1978 | Martin et al. | 422/112 |

Primary Examiner—Joseph Scovronek
Attorney, Agent, or Firm—Wenderoth, Lind & Ponack

[57] ABSTRACT

A control and monitoring system for an oxygen generation device having a plurality of chemical oxygen generation elements sequentially decomposed to continuously generate oxygen. The control and monitoring system has a temperature sensor operatively coupled to each of the chemical oxygen generation elements, except the one to be ignited last, for producing a first control signal in response to the heat generated by the chemical oxygen generation elements during decomposition, a gas flow sensor disposed in the oxygen outlet has the oxygen generation elements and responsive to a flow rate less than a predetermined minimum flow rate to produce a second control signal, a sequential ignition mechanism operated on the occurrence of both the first control signal and the second control signal, as an ignition signal for igniting the oxygen generation elements one after another, and an alarm operative in response to the second control signal after a time interval of not less than a predetermined magnitude for indicating the interruption of oxygen generation for an abnormally long time interval.

Preferably, light emitter indicator means are provided to indicate ignition of the corresponding oxygen generating element.

4 Claims, 4 Drawing Figures

CONTROL AND MONITORING SYSTEM FOR OXYGEN GENERATING DEVICE

BACKGROUND OF THE INVENTION

This invention relates to an oxygen generation device comprising a plurality of oxygen generation elements automatically sequentially decomposed one at a time so as not to interrupt the generation of oxygen, and more particularly to a control and monitoring system for such an oxygen generation device by which the user can confirm whether or not oxygen is being normally generated.

Chemical oxygen generation elements, including principally compounds generating oxygen through chemical reaction of thermal decomposition, are suitable for use with portable, small-sized oxygen generation devices, because the heavy, pressure-proof vessels are not required for the operation of such generation elements. These chemical oxygen generation elements are most typically chlorate system elements and are called chlorate candles. A chlorate candle is comprised principally of alkali metal chlorate and has subsidiary agents such as an exothermic agent and a chlorine absorbent and is shaped into a candle by being filled into a canister. Upon ignition of one end thereof by a detonator, electric heater, or the like, the chlorate candle starts to decompose so as to generate oxygen and also generates heat. It continues to decompose through a chain reaction owing to the self generated heat of decomposition, resulting in the continuous generation of oxygen. Such chemical oxygen generation elements, which can be readily manufactured, have a lifetime on the order of from 10 to 30 minutes. Thus when it is required to generate oxygen for a long period of time such as one hour or more, the stable generation of the oxygen is more easily achieved by preparing a plurality of small-sized chlorate candles and sequentially igniting them so as not to interrupt the generation of oxygen rather than provide a single large-sized candle. In this case however, when the oxygen generation element in the process of being decomposed has completed or nearly completed its generation of oxygen, the succeeding candle must be ignited immediately. Sequential ignition systems for this purpose are preferably simple to manipulate and reliable in operation because they are frequently employed for equipment used in an emergency.

If such sequential ignition systems get out of order, or if there is a failure of the ignitor, or a fall-off or suspension of the decomposition by reason of a malfunction of the oxygen generation elements, it is necessary to immediately signal the user so that he may take the required countermeasures, unless the suspension of oxygen generation is of a duration short enough to cause no hindrance to the use of the equipment in which the oxygen generation elements are provided. Further, devices for generating oxygen for long periods of time preferably include means for indicating during operation approximately how much capacity to generate oxygen remains.

Conventional oxygen generation devices comprising a plurality of oxygen generation elements have been provided with coutermeasures for the described problems only to a very limited extent, and such devices commonly require the utmost attention and complicated manipulations by the user.

Accordingly, it is an object of the present invention to provide a control and monitoring system for an oxygen generating device which does not require such close attention and such complicated manipulations by the user and which prevents failure due to the interruption of oxygen generation.

SUMMARY OF THE INVENTION

The present invention provides a control and monitoring system for an oxygen generation device having a plurality of chemical oxygen generation elements sequentially decomposed to continuously generate oxygen. The control and monitoring system comprises temperature sensor means operatively coupled to each of the chemical oxygen generation elements, other than the chemical oxygen generation element to be ignited last, for producing a first control signal in response to the heat generated by the corresponding chemical oxygen generation element due to the decomposition thereof, gas flow sensor means disposed in an oxygen outlet common to all the oxygen generation elements and responsive to a flow rate less than a predetermined minimum flow rate to produce a second control signal, a sequential ignition mechanism supplied with the logic product of the first control signal from each of the temperature sensor means and the second control signal from the gas flow sensor means, as an ignition signal for igniting the oxygen generation elements one after another, and alarm means operative in response to the second control signal from the gas flow sensor means after a time interval of not less than a predetermined magnitude for indicating the interruption of oxygen generation for an abnormally long time interval.

Preferably, light emitter indicator means are provided which are responsive to the ignition signal to indicate the ignition of the corresponding oxygen generation element.

BRIEF DESCRIPTION OF THE DRAWINGS

The present invention will be more readily apparent from the following detailed description taken in conjuction with the accompanying drawing in which.

DESCRIPTION OF THE PREFERRED EMBODIMENT

While the present invention is applicable to any desired number of chemical oxygen generation elements, it will now be described in conjuction with three oxygen generation elements only for purposes of illustration. As above described, each of the chemical oxygen generation elements is principally sodium chlorate mixed with an exothermic agent and a chlorine absorbent and is shaped into a candle such as by being filled into a canister. Such a chemical oxygen generation element, generally called a "chlorate candle", is of the standard type adapted to be ignited by an electric igniter disposed adjacent thereto.

Figure 1:
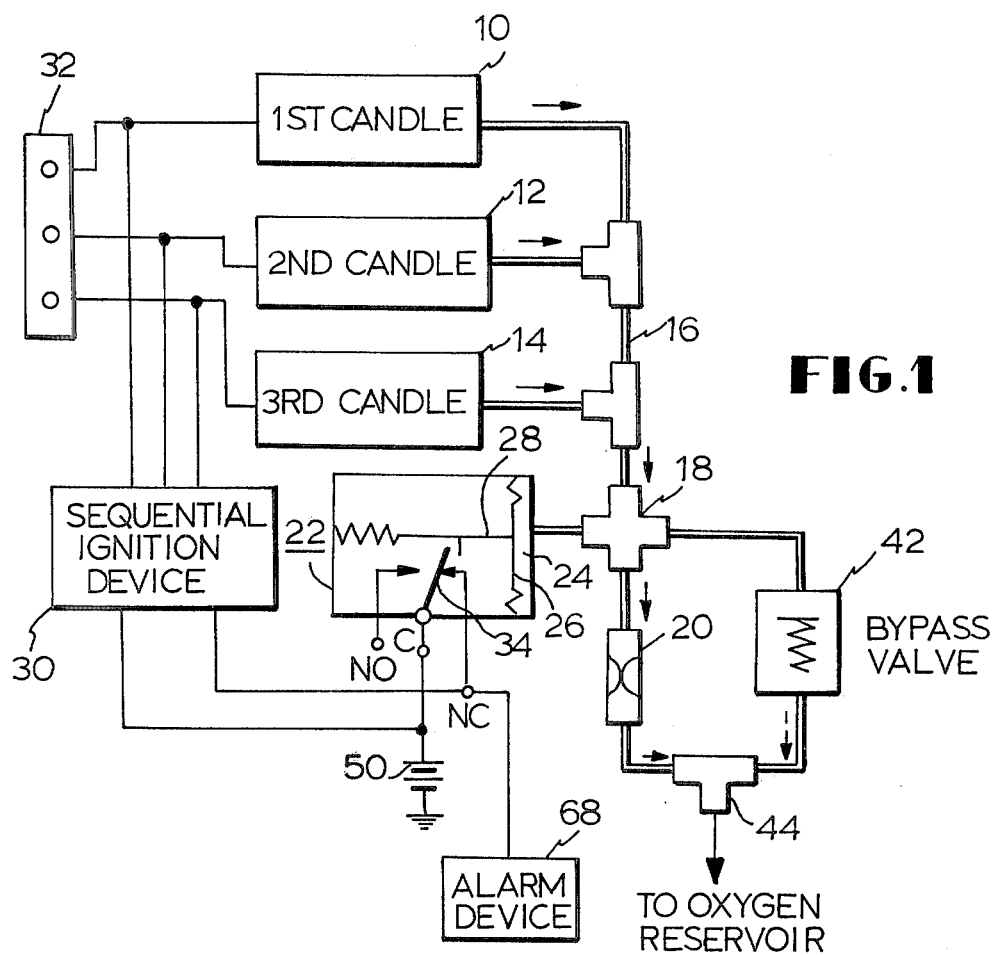
FIG. 1 is a schematic diagram of the oxygen generating device having a control and monitoring system constructed in accordance with the principles of the present invention and a plurality of chemical oxygen generation elements connected in fluid communication with a gas flow sensor.

In the arrangement illustrated in FIG. 1, the canister of a first, a second and a third candle 10, 12 and 14 respectively are connected in fluid communication with a common feed conduit 16. The feed conduit 16 is connected via a manifold 18 to an orifice 20. The manifold 18 is also connected at one outlet to a pressure switch generally designated by the reference numeral 22. The pressure switch 22 and the orifice 20 constitute a gas flow sensor connected to the feed conduit 16 downstream of the last candle, in this case the third candle 14.

The pressure switch 22 includes a pressure chamber 24 communicating with the manifold 18 and therefore the feed conduit 16, and separated from the remaining space in the switch by a diaphragm 26. The diaphragm 26 includes a spring loaded rod 28 extending from the center of the surface of the diaphragm into the remaining space in the switch. The rod 28 is operatively coupled to a movable arm of a microswitch 34 including a pair of stationary contacts connected respectively to terminals NO and NC. The movable arm of the microswitch 34 is connected to a terminal C which in turn is connected to a DC source 50 having a negative side connected to the ground.

The pressure switch forms part of a sequential ignition device, the remainder of which is shown schematically at 30 and which is described more fully hereinafter. Also connected to the sequential ignition device is a luminous indicator device 32, to be described more fully hereinafter. To the terminal NC of pressure switch 22 is connected an alarm device 68, also described more fully hereinafter.

The manifold 18 is also connected at a separate outlet to a bypass valve 42 for a purpose which will be explained later. The outlets from the bypass valve 42 and from the orifice 20 are connected, for example, to an oxygen reservoir (not shown) through another manifold 44. Thus the bypass valve 42 is connected across the orifice 20.

In the arrangement of FIG. 1, the first candle 10 is ignited by a manually operated igniter in the sequential ignition device to generate oxygen and deliver it to the feed conduit 16. The second and third candles 12 and 14 are successively ignited when the flow rate of oxygen flowing through the feed conduit 16 for the preceding candle falls below a predetermined minimum.

The minimum permissible flow rate for the oxygen is determined by the particular purpose for which the oxygen is being used and also depends upon the presence or absence of an oxygen reservoir and the capacity of the reservoir where one is present. In the embodiment illustrated, the minimum permissible flow rate has been chosen to be 0.35 liter per minute with a normal flow rate of 2.5±0.5 liters per minute, both figures being converted to STP, that is, one atmosphere pressure at 25° C.

In order to properly operate the pressure switch 22, the pressure switch 22 and the orifice 20 must respectively have operating constants and dimensions meeting the following requirements:

(i) When the oxygen flowing through the feed conduit 16 has a flow rate equal to or higher than the predetermined minimum value just specified the pressure switch 22 is maintained in its open position by means of a back pressure through manifold 18 caused by the orifice 20; and (ii) When the flow rate of the oxygen becomes less than the predetermined minimum value because of burn-out of a particular candle, the pressure switch 22 is moved to and maintained in its closed position owing to a corresponding decrease in back pressure caused by the orifice 20.

The microswitch 34 is shown in FIG. 1 as being in its closed position.

Thus when the flow rate of the oxygen flowing through the feed conduit 16 is greater than the predetermined minimum magnitude, the diaphragm 24 along with the spring loaded rod 28 is moved in the lefthand direction as viewed in FIG. 1 to force the movable arm of the microswitch 34 into engagement with the stationary contact connected to the terminal NO resulting in the opening of the microswitch 34. On the contrary, if the flow rate drops below the predetermined minimum magnitude then the diaphragm 24 forces the movable switch 34 arm into engagement with the stationary contact connected to the terminal NC. Therefore the microswitch 34 is closed to produce a control signal at the terminal NC.

In other words, the pressure switch 22 senses a flow rate less than the predetermined minimum value due to the low pressure of oxygen within the conduit 16. However, it is to be noted that the pressure switch 22 can accommodate much higher flow rates which can be accepted by the system.

The generation of oxygen may beome intermittently excessive resulting in the danger that components within the system may be subjected to excessive pressures. The bypass valve 42 is immediately responsive to an increase in pressure within the conduit 16 beyond a magnitude sufficient to maintain the pressure switch 22 in its open position by automatically opening against the action of an associated spring. The opening of the bypass valve 42 permits the flow of oxygen to pass through the now open valve to prevent an excessive increase in pressure within the system.

Figure 2:
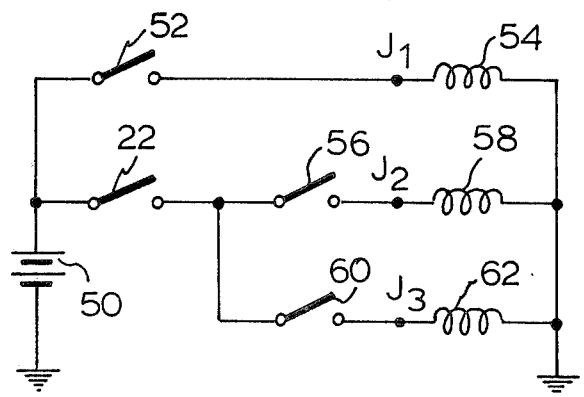
FIG. 2 is a schematic circuit diagram of a sequential ignition mechanism constructed in accordance with the principles of the present invention.

The sequential ignition device 30 shown schematically in FIG. 1 can be an electric circuit as shown in FIG. 2. The arrangement illustrated comprises the source of direct current 50 (see FIG. 1), a manually operated starting switch 52 and an electrical igniter 54 for the first oxygen generation element or candle 10 (see FIG. 1), all series connected in the named order with the source 50 having its negative side connected to the ground. Also the pressure switch 22 (see FIG. 1), a thermal switch 56 constituting a temperature sensor for the first candle, and an electrical igniter 58 for the second candle are series connected across the source 50. The pressure switch 22 is further connected to a thermal switch 60 subsequently connected to an igniter 62. The thermal switch 60 acts as a thermal sensor for the second candle while 62 constitutes an igniter for the third candle and is connected to the ground, that is, to the negative side of the source 50. As shown in FIG. 2, the switches 52, 56 and 60 are connected to the igniters 54, 58 and 62 through junctions $J_1$, $J_2$ and $J_3$ respectively for a purpose which will be explained later.

The thermal switches 56 and 60 in the example illustrated are adapted to be closed at a temperature of about 60° C. and 102° C. or more and are disposed in contact with the canisters of the associated candles 10 and 12 respectively.

It is to be noted that the candle to be last ignited, in this case the third candle 14, is not in physical contact with a thermal switch.

The igniters constituted by 54, 58 and 62 are preferably formed of lengths of nichrome wire having a suitable diameter, and coated with a mixture that becomes unstable and highly exothermic when sufficiently heated, consuming the igniter.

Prior to the start of the device by the circuit shown in FIG. 2, the pressure switch 22 is in its closed position while all the remaining switches are in their open positions. Then the starting switch 52 is manually closed to cause a current from the source 50 to flow through the now closed switch 52 and the igniter 54 to cause the first candle 10 (see FIG. 2) to be ignited and generate oxygen while decomposing. The oxygen thus generated flows through the conduit 16 as shown by the arrows in FIG. 1.

When the oxygen flowing through the conduit 16 reaches a flow rate in excess of the predetermined minimum value therefor, the pressure switch 22 is immediately moved into its open position and is maintained in the open position. The first candle continues to decompose and generate oxygen. The temperature of the canister (not shown) of the first candle increases after a time delay relative to the opening of the pressure switch 22 until the thermal switch 56 in contact with the canister is closed. This closure of the thermal switch 56 does not cause a flow of current through the igniter 58 because of the open condition of the pressure switch 22.

The first candle is gradually consumed until the flow rate of oxygen flowing through the conduit 16 decreases to below the predetermined minimum value. At that time, the pressure switch 22 is closed while the canister for the first candle is still sufficiently hot to maintain the thermal switch 56 in its closed position. Thus a current from the source 50 flows through the now closed switches 22 and 56 and the igniter 58. Therefore the igniter 58 ignites the second candle resulting in the generation of oxygen from that candle. Thus the flow rate of oxygen is again increased beyond the predetermined minimum value to move the pressure switch 22 to, and maintain it in, its open position. Then the thermal switch 60 for the second candle is closed and maintained in its closed position due to heat generated from the decomposition of said second candle.

When the second candle approaches the end of its burn, the pressure switch 22 is closed to permit the third candle to be ignited in the same manner as above described.

In the process as above described, each candle burns hot enough to burn the associated length of nichrome wire in the igniter away. Accordingly current is no longer drawn through these portions of the circuit, thus preventing interference with the ignition of the candles which are to be ignited in the later stages.

It will readily be understood that the closure of the pressure switch 22 is equivalent to the delivery of a second control signal from the gas flow sensor to the igniter for the second or third candle (the igniter 58 or 60) while the closure of the thermal switch 56 or 60 is equivalent to the delivery of a first control signal from the temperature sensor for the first or second candle to that igniter. Also the closure of both the series connected pressure switch 22 and the thermal switch 56 or 60 corresponds to the logic product, i.e. the simultaneous presence, of the first and second control signals.

It has been found that the use of a thermal switches having an operating temperatures of 60°±6° C. and 102°±7° C. produce a satisfactory result. That is, the present invention can attain the desired purposes with a thermal switch which does not have too high an accuracy. While the thermal switch has been described as being positioned in contact with the canister for an associated candle, it is to be understood that the switch may be positioned at any desired position as long as it can indirectly sense the heat of combustion generated by an associated candle.

Further, the temperature sensor (the thermal switch) continues to deliver a signal after the flow sensor has stopped delivering a signal because of the recovery of the flow rate of oxygen flowing through the conduit. The wall of the canister for each candle increases in temperature after a suitable time delay following the ignition of the candle and is reliably maintained at an elevated temperature not only during the burning of the candle but also for some time after the burning has been completed. Accordingly, the thermal sensor is preferably disposed on the wall of the canister of the associated candle.

From the foregoing it will be appreciated that the oxygen generation elements or candles other than for the first one are automatically ignited one after another eliminating the necessity of effecting repeated manual manipulation during use of the oxygen generating device. However, use of only the arrangement in FIG. 2 has a disadvantage in that the user can not know the number of candles which have already been ignited. That is, the user can not know the capacity for generating oxygen which still remains after operation of the device for a length of time.

Figure 3:
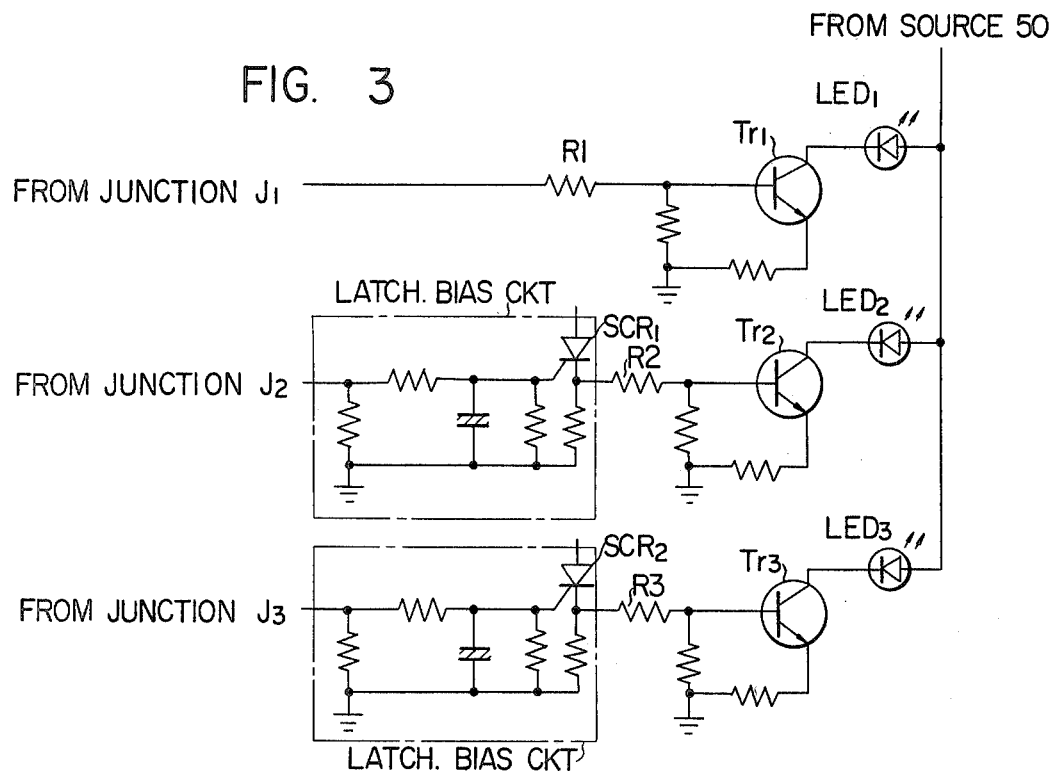
FIG. 3 is a schematic circuit diagram of a luminous indicator device constructed in accordance with the principles of the present invention.

Therefore an indicator device 32 is preferably provided for indicating the number of candles already ignited so that the user of the device can estimate from the number of the candles not yet burnt the capacity for generation of oxygen which remains. The indicator device can have a circuit configuration as shown in FIG. 3. The arrangement illustrated comprises a first common emitter NPN transistor $Tr_1$ including a base electrode connected to the junction $J_1$ of the ignition device (see FIG. 2) through a resistor $R_1$ and a collector electrode connected to a first semiconductor light-emitting diode $LED_1$, a second common emitter NPN transistor $Tr_2$ including a base electrode connected to the junction $J_2$ of the ignition device (see FIG. 2) through a latching circuit means constituted by a latching bias circuit and a resistor $R_2$, and a collector electrode connected to a second light emitting diode $LED_2$. A third common emitter NPN transistor $Tr_3$ is connected between the junction $J_3$ of the ignition device (see FIG. 2) and a third light emitting diode $LED_3$ in the same manner as the second transistor $Tr_2$. All the light emitting diodes $LED_1$, $LED_2$ and $LED_3$ are connected to the source 50 in FIG. 2.

The latching bias circuit for the transistor $Tr_2$ is of a conventional type including an SCR designated by $SCR_1$. The SCR includes a control electrode connected to the junction $J_2$ through an R-C network, an anode electrode connected to the junction $J_1$ and a cathode electrode connected to the base electrode of the transistor $Tr_2$ through a resistor $R_2$. The latching bias circuit for the transistor $Tr_3$ is identical to the circuit just described and includes and SCR designated by $SCR_2$ and is electrically coupled to the junction $J_3$.

The transistors $Tr_1$, $Tr_2$ and $Tr_3$ serve as combined drivers and current limiters for the diodes $LED_1$, $LED_2$ and $LED_3$ respectively.

When the starting switch 52 is closed, the first transistor $Tr_1$ is turned on in response to a voltage or an ignition signal developed at the junction $J_1$. This turning-on of the transistor $Tr_1$ permits a current from the source 50 to flow through the diode $LED_1$ to cause the diode to emit light indicating that the first candle has been ignited.

When a current from the source 50 flows through the resistor 58 via the then closed switches 22 and 56 to ignite the second candle, the voltage developed at the junction $J_2$ is applied to the latching bias circuit for the transistor $Tr_2$ to turn the first SCR on, which causes the transistor $Tr_2$ to be turned on resulting in the diode $LED_2$ emitting light thereby indicating the ignition of the second candle. The first SCR is maintained in its ON state even after the ignition signal to the second candle has disappeared. This means that the transistor $Tr_2$ is maintained in its ON state and therefore the diode $LED_2$ continues to emit light.

The process as above described is repeated with the third transistor $Tr_3$ to turn the third diode $LED_3$ on and hold it in its light emitting state.

From the foregoing it is seen that the user can estimate the remaining capacity for oxygen generation on the basis of the number of diodes emitting light.

The light emitting diodes are advantageously disposed on a control panel also having disposed thereon the manual starting switch 52 and any other switches needed for manual control of the system.

Figure 4:
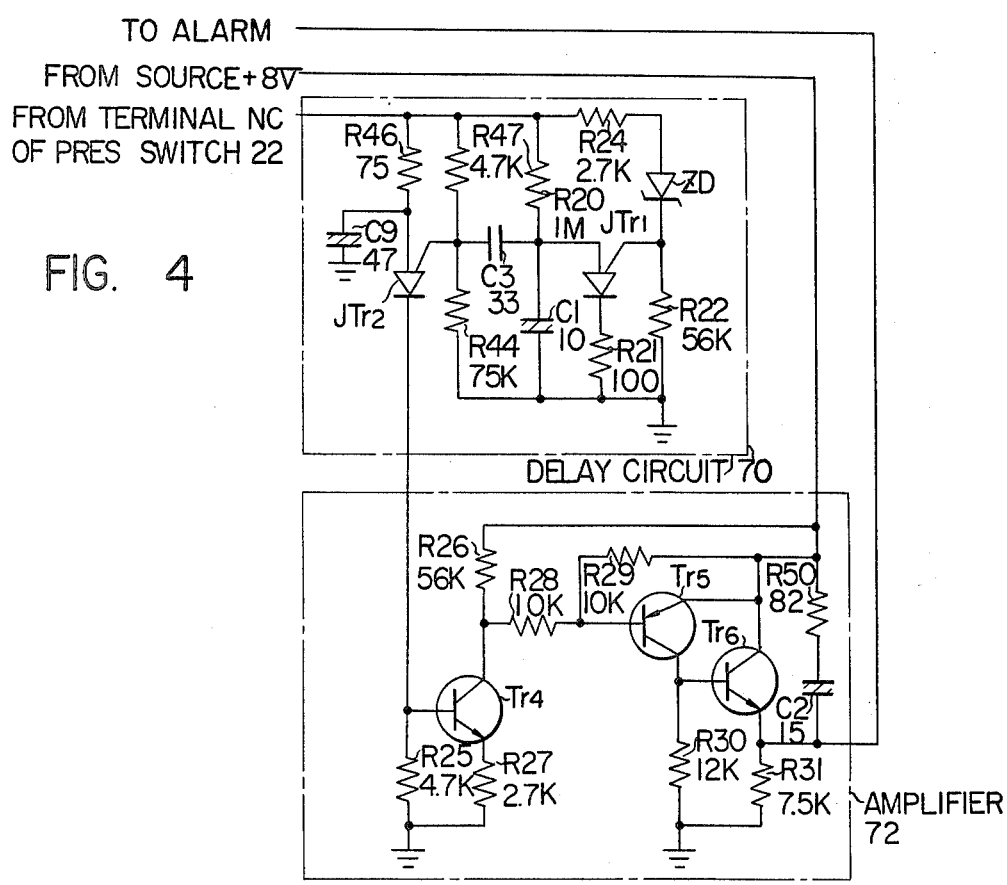
FIG. 4 is a schematic circuit diagram of an alarm device constructed in accordance with the principles of the present invention.

An alarm is very desirable for warning the user that the generation of oxygen has been interrupted for an abnormally long time interval during operation of the device. To this end, an alarm device 68 is operatively coupled to the pressure switch 22 as shown in FIG. 1. The alarm device has a circuit configuration as shown in FIG. 4. The arrangement illustrated comprises a delay circuit generally designated by the reference numeral 70 and which is connected to the pressure switch 22 at the terminal NC (see FIG. 1), and an amplifier circuit generally designated by the reference numeral 72 for driving an associated alarm and which is connected to the delay circuit 70.

As shown in FIG. 4, wherein circuit parameters are denoted in kilohms, megohms and microfarads beside corresponding components, the delay circuit includes a relaxation oscillator formed of a programmable unijunction transistor $JTr_1$ including an anode electrode connected to the junction of series connected resistor R20 and capacitor C1 between the terminal NC of the pressure switch 22 (see FIG. 1) and the ground, a cathode electrode connected via a resistor R21 to the ground and a gate electrode connected to the cathode electrode of a Zener diode ZD and also to the ground through a resistor R22. The Zener diode ZD includes an anode electrode connected to the terminal NC of pressure switch 22 through a resistor R24. The delay circuit further has a second programmable unijunction transistor JTr, having the diode connected to the terminal NC of switch 22 through resistor R46 and to one side of grounded capacitor 47, and having the gate electrode connected to the anode of the transistor JTr, through a capacitor $C_3$.

The relaxation oscillator oscillates at an ultralow frequency determined by the time constant of the capacitor C1 and the resistor R20. That is, it has an oscillation period equal to about one and a half times the time constant of the capacitor C1 and resistor R20, although the oscillation period is more or less dependent upon both the bias and the anode voltage applied to the transistor $JTr_1$. In the example illustrated it is assumed that the maximum permissible duration of interruption of oxygen generation is about 15 seconds. Thus the relaxation oscillator has an oscillation period of $15\pm5$ seconds as determined by both the capacitor C1, having a capacitance of 10 microfarads, and the resistor R20, having a resistance of 1 megohm. However, any desired magnitudes of the capacitance and resistance the capacitor and resistor C1 and R20, respectively, which will produce stable oscillation can be selected to provide an oscillation period of about 15 seconds. In order to effect such an ultralow frequency oscillation, it is required only to apply to the unijunction transistor $JTr_1$ a voltage equal to the sum of the on-state voltage across the anode and cathode electrodes thereof and the voltage across the gate and anode electrode. The on-state voltage corresponds to a low valley current and the other, latter voltage is approximately equal to the voltage drop across a single diode.

The gate potential applied to the transistor $JTr_1$ is stabilized by the temperature compensation achieved by the Zener diode ZD acting as an ordinary diode. However, the diode ZD may be made to exhibit the ZENER effect, if desired.

With the pressure switch 22 closed, the oscillator remains connected to the source 50 (see FIG. 1). Under these circumstances, the capacitor C1 is charged from the source 50 through the resistor R20 to increase the anode potential applied to the transistor $JTr_1$. After the lapse of about 15 seconds from the closure of the pressure switch 22, the transistor $JT_1$ is turned to its ON state by the increase in anode potential. At that time the electric charge on the capacitor C1 discharges through the now conducting transistor $JTr_1$ which is acting as a thyrister and the resistor R21 to develope a negative pulse at the anode electrode of the transistor $JTr_1$. This negative pulse is supplied to the gate electrode of the programmable unijunction transistor $JTr_2$ through the capacitor C3.

As a result, the anode potential on the transistor $JTr_2$ becomes instantaneously positive with respect to the gate potential by a voltage not less than the threshold voltage $V_{GT}$ across the anode and gate electrode of the transistor $JTr_2$. This causes the turning-on of the transistor $JTr_2$. Resistors R46 and R47 connected between the terminal NC of the pressure switch 22 and the anode and gate electrodes of the transistor $JTr_2$ respectively have low resistance values such that a current not less than the holding current for the transistor $JTr_2$ flows therethrough. Therefore, once the transistor $JTr_2$ has been turned on, the same continues to conduct unless the voltage from the pressure switch 22 disappears.

Thus the delay circuit 70 produces an output from the cathode electrode of the unijunction transistor $JTr_2$ which output is delayed a predetermined time interval, in this case about 15 seconds, with respect to the closure of the pressure switch 22. This output is applied only to the base electrode of a common emitter NPN transistor $Tr_4$ in amplifier circuit 72 to increase the base potential on the latter. This results in the turning-on of the transistor $Tr_4$. The transistor $Tr_4$ includes a collector electrode connected to the positive side of the separate 8 volt DC source (not shown) through a resistor R26 and through a resistor R28 and a resistor R29 connected across a base-to-emitter circuit of a PNP transistor $Tr_5$. The PNP transistor $Tr_5$ is connected with transistor $Tr_6$ in a complementary pair.

Because the collector electrode of the transistor $Tr_4$ is connected to the 8 volt source as above described, the base potential applied to a transistor Tr₅ is changed simultaneously with the turning-on of the transistor Tr₄. More specifically, the transistor Tr₅ has a base potential much less than its emitter potential resulting in the turning-on of the transistor Tr₅. As a result, the NPN transistor Tr₆ has the base potential increased so as to be turned on. When turned on, the transistor Tr₆ has an emitter potential substantially equal to the source voltage of 8 volts.

An alarm (not shown) has a positive terminal connected to the emitter electrode of the transistor Tr₆, and the turning on of the transistor Tr₆ permits the 8 volt source to supply electric power to the alarm to actuate the alarm such as by emitting sound. The alarm proper can be a commercially available transistorized device having a well known construction for driving an electromagnetic transducer at a high efficiency.

In the circuit of FIG. 4 a series connected resistor R50 and capacitor C2 are connected across the collector and emitter electrodes of the transistor Tr₆ to connect the reactive component of the current flowing through the alarm. Further, the arrangement comprises another capacitor and various resistors for the purposes of biasing associated transistors and preventing the transistors from being erroneously turned on upon connecting the circuit to the source of current, but they are not essential parts of the present invention and are not described in detail.

If the device in FIG. 4 warned of a long interruption of oxygen generation resulting from some failure in the sequential ignition mechanism, as above described in conjunction with FIG. 2, or any defect occurring in any of the candles, then the user can immediately replace the oxygen generation device presently in use with a spare one. Alternatively, where the device is being used as a breathing device in a non-breathable environment, he may return to an environment requiring no generation of oxygen. Under these circumstances, it is preferable to be able to manually ignite the last candle. Such a measure makes it possible to generate an amount of oxygen equal to that generated by a single candle unless the interruption of oxygen generation occurs in the last candle.

The present invention has several advantages. For example, the oxygen generation device of the present invention is easy to manipulate and is highly reliable and secure so that the user can devote his attention to the job at hand. Also the control and monitoring mechanisms are extremely compact and occupy only small spaces within the device as well as being inexpensive because the mechanisms are constructed so as to be operated in good correlation. With these advantages in mind, the present invention is most suitable for use with a portable breathing apparatus employed for fires and/or industrial accidents evolving harmful gases or accidents resulting in an environment which is deficient in oxygen. However, it is to be understood that the present invention is equally applicable to large-scale stationary apparatus.

While the present invention has been illustrated and described in conjunction with a preferred embodiment thereof, it is to be understood that numerous changes and modifications may be made without departing from the spirit and scope of the present invention. The present invention may be operatively associated with any mechanism for increasing its reliability and/or manipulative properties. For example, it is particularly desirable to provide mechanisms for testing the operation of the light emitting indicator and alarm devices prior to the starting of the device, and safety devices for preventing malfunction of various switches, since the oxygen generation device of the present invention when used with a breathing apparatus is usually employed after many hours have elapsed since its manufacture, and moreover is used in cases of emergency.

What I claim is:

1. A control and monitoring system for an oxygen generation device having a plurality of chemical oxygen generation elements for being sequentially ignited and decomposed for continuously generating oxygen, said system comprising: temperature sensor means operatively associated with each of said chemical oxygen generation elements other than the chemical oxygen generation element to be last ignited for producing a first control signal in response to the heat generated by the corresponding chemical oxygen generation element during the decomposition thereof; gas flow sensor means for sensing the flow of oxygen from said oxygen generation elements and responsive to a flow rate less than a predetermined minimum magnitude of flow of oxygen for producing a second control signal; an ignition mechanism connected to said temperature sensor means and to said gas flow sensor means and operative in response to the presence of both said first control signal from the respective temperature sensor means and said second control signal from said gas flow sensor means, for sequentially igniting said oxygen generation elements one after another; a plurality of light emitting indicator means, one for each of said chemical oxygen generation elements, electrically coupled to said ignition mechanism, a first one of said light emitting indicator means responding to an ignition signal for the first one of said oxygen generation elements applied thereto from said ignition mechanism for emitting light to indicate the ignition of said first oxygen generation element, each of the remaining light emitting indicator means responding to an ignition signal for the associated oxygen generation element applied thereto from said ignition mechanism for emitting light to indicate the ignition of the associated oxygen generation element, and latching circuit means connected to each of said indicator means other than the indicator means for the first ignited chemical oxygen generation element for holding the corresponding indicator means in the light emitting condition after cessation of said first control signal; and alarm means connected to said gas flow sensor means and operative in response to a continuous second control signal from said gas flow sensor means after a time interval of not less than a predetermined magnitude for indicating the continuous interruption of oxygen generation for said time interval and for as long as said second control signal continues.

2. A control and monitoring system as claimed in claim 1 in which said temperature sensor means is a temperature sensitive switch associated with each oxygen generation element and which is closed when said oxygen generation element reaches a predetermined temperature, and said gas flow sensor means comprises a pressure sensitive switch and an orifice means, said ignition mechanism comprising a source of current and a plurality of resistance igniters connected in parallel with said source of current, said pressure sensitive switch being connected in series with each of the igniters other than the igniter for the first oxygen generation element, and the temperature sensitive switch for each oxygen generation element being connected in series with the igniter for the next successive oxygen generation element in said plurality of oxygen generation elements, and the temperature sensitive switch for the second oxygen generation element being closed at a temperature higher than the temperature at which the temperature sensitive switch for the first oxygen generation element is closed.

3. A control and monitoring system as claimed in claim 1 in which said light emitting indicator means are light emitting diodes.

4. A control and monitoring system as claimed in claim 1 wherein said alarm means comprises a delay circuit including a relaxation oscillator and latch responsive to said second control signal from said gas flow sensor means for starting to oscillate with an oscillation period substantially equal to said predetermined magnitude of the time interval for producing an output with a delay time relative to said second control signal, said delay time equaling said oscillation period, and an amplifier circuit connected to said delay and latch circuit and including a transistor responsive to said delayed output for being turned on to energize an alarm to warn of the abnormal interruption of oxygen generation.

* * * * *